United States Patent
Feng et al.

(10) Patent No.: US 12,442,950 B1
(45) Date of Patent: Oct. 14, 2025

(54) EVALUATION METHOD FOR RELATIVE CONTRIBUTIONS OF HEAT SOURCES BASED ON HELIUM AND APPLICATION THEREOF

(71) Applicant: CHINA UNIVERSITY OF PETROLEUM (EAST CHINA), Qingdao (CN)

(72) Inventors: Ziqi Feng, Qingdao (CN); Yangming Li, Qingdao (CN); Chenzhao Quan, Qingdao (CN); Wei Wang, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 19/094,824

(22) Filed: Mar. 29, 2025

(30) Foreign Application Priority Data

Apr. 15, 2024 (CN) .......................... 202410445689.2

(51) Int. Cl.
*G01V 11/00* (2006.01)
*G01K 11/324* (2021.01)
(Continued)

(52) U.S. Cl.
CPC .......... *G01V 11/002* (2013.01); *G01K 11/324* (2021.01); *G01L 1/246* (2013.01); *G01N 33/24* (2013.01)

(58) Field of Classification Search
CPC .... G01V 11/002; G01K 11/324; G01L 1/246; G01N 33/24
See application file for complete search history.

(56) References Cited

U.S. PATENT DOCUMENTS

2023/0393114 A1* 12/2023 Darrah ................. G01N 33/241
2025/0116647 A1* 4/2025 Poitzsch ............... E21B 49/086

FOREIGN PATENT DOCUMENTS

CN       117711503 A       3/2024
CN       117744910 A       3/2024
(Continued)

OTHER PUBLICATIONS

Barry, Helium and carbon isotope systematics of cold "mazuku" CO2 vents and hydrothermal gases and fluids from Rungwe Volcanic Province, southern Tanzania, Chemical Geology 339 (2013) 141-156 (Year: 2013).*

(Continued)

*Primary Examiner* — Michael J Dalbo
(74) *Attorney, Agent, or Firm* — CBM PATENT CONSULTING, LLC (57) ABSTRACT

An evaluation method for relative contributions of heat sources based on helium and application thereof, belonging to the technical field of helium origin identification, migration mechanism, and accumulation process analysis. Relative heat contribution values of the mantle and the crust to a basin geothermal system are estimated by combining $^3$He/enthalpy ratios calculated according to the formula (1) and the heat balance equation, and an evaluation method for relative contributions of heat sources of helium in the context of deep thermal fluid activities is further improved. A detection device is suitable for deep geothermal resource exploration, thermal fluid activity monitoring in an early stage of oil and gas field development, and geological science research. By precisely evaluating relative contributions of a mantle source and a crust source, combined with temperature and pressure data, a scientific basis is provided for resource development, and exploration risks are reduced.

3 Claims, 4 Drawing Sheets

(51) Int. Cl.
*G01L 1/24* (2006.01)
*G01N 33/24* (2006.01)

(56) References Cited

FOREIGN PATENT DOCUMENTS

GB    2547464 A  *  8/2017  ............. G01N 33/24
JP    09236075 A     9/1997

OTHER PUBLICATIONS

Tao (CN-110579810)—English Translation (Year: 2019).*
Liu Jianzhang et al., Thermal fluid in ying-qiong basin and its significance of oil-gas geology Natural Gas Exploration and Development 12-15 Publication Date:Mar. 30, 2004.

* cited by examiner

EVALUATION METHOD FOR RELATIVE CONTRIBUTIONS OF HEAT SOURCES BASED ON HELIUM AND APPLICATION THEREOF

CROSS-REFERENCE TO RELATED APPLICATIONS

This application claims priority to Chinese Patent Application Ser. No. CN2024104456892 filed on 15 Apr. 2024.

FIELD OF THE INVENTION

The present disclosure relates to an evaluation method for relative contributions of heat sources of helium in the context of deep thermal fluid activities, and belongs to the technical field of helium origin identification, migration mechanism, and accumulation process analysis.

BACKGROUND OF THE INVENTION

Helium (He) is a unique and irreplaceable element, and has important application value in many fields such as military science, industry, scientific research, etc. due to its special physical and chemical properties. The special properties of helium, such as low reactivity, low boiling point, and low density, render it indispensable in many fields.

Deep major faults or diapiric structures distributed in oil and gas bearing basins, along with the associated upward migration of thermal fluid create migration and leakage channels for deep volatiles, facilitating release and migration of helium. A magmatic helium ($^3$He) component exists in geothermal fluid, with a $^3$He/$^4$He value greater than 0.02Ra, indicating that volatile substances directly come from the mantle or come from degassed magma invading the mantle. Previous studies have used helium isotope $^3$He/$^4$He distribution and an R/Ra value (R=($^3$He/$^4$He) sample; Ra=($^3$He/$^4$He) air=1.4×10$^{-6}$) as a fundamental basis for identifying the origin of natural gas, whether from the crust or the mantle, and determining their proportions. When helium in magma transfers to a fluid, heat transfer is certainly accompanied geologically, indicating direct heat and mass transfer between the fluid and the magma. Therefore, a relationship between helium and heat is often indirect. A geothermal system on the continents mainly includes two heat source types, namely the mantle and the crust (radioactive origins). Each of these heat sources has a specific $^3$He/enthalpy ratio and can be used for analyzing relative contributions of heat sources of helium. In a similar context, it is also possible to predict a thermal driving mechanism and relative contributions of magmatic heat and crustal heat to geothermal fields. Currently, there is no method for analyzing a contribution of helium as a heat source in China. However, the heat sources in the oil and gas bearing basins have an important influence on formation of petroleum and natural gas in the basins, a geothermal flow in the context of the basin, and restoration of burial history and thermal history. Particularly in regions where there may be a contribution from a deep mantle source of heat, such as oil and gas bearing basins developed in deep faulting contexts, there is currently a lack of studies on a thermal driving mechanism of helium in the context of deep thermal fluid activities, and an evaluation has not yet been further improved.

SUMMARY OF THE INVENTION

For shortcomings of an existing evaluation and analysis method and to accurately identify heat contributions of the mantle and the crust to a basin geothermal system with a context of major faulting, the present disclosure provides an evaluation method for relative contributions of a mantle heat source and a crust heat source in the context of deep thermal fluid activities. Based on a heat balance equation, the method calculates relative contributions of the two heat source types to the basin geothermal system. The present disclosure further provides a detection device applying the method.

The present disclosure provides technical solutions as follows:

An evaluation method for relative contributions of heat sources based on helium, comprising a non-transitory computer readable medium operable on a computer with memory for the evaluation method for relative contributions of heat sources based on helium, and comprising program instructions for executing the following steps of:

Step 1: performing a geological survey to confirm the presence of deep channel communication generated in a study region in the context of major faulting and the presence of development and evolution of mud diapirs and upward migration of thermal fluid;

Step 2: collecting a sample from a reservoir of a typical well in the study region, and separating and purifying the sample;

Step 3: testing and analyzing the sample to obtain the content of $CO_2$, $^3$He, and $^4$He;

Step 4: calculating $^3$He/enthalpy ratios of samples in different depths according to a formula (1) and $CO_2$ and $^3$He concentration obtained through testing, where the formula (1) is expressed in a dimensionless form, i.e. φ=f/(RT), which is divided into two parts, namely an ideal gas part $\varphi^\circ$ and a residual part $\varphi^T$, so φ:

$$\frac{f(\rho, T)}{RT} = \phi(\delta, \tau) = \phi^\circ(\delta, \tau) + \phi^r(\delta, \tau) \tag{1}$$

where $\delta=\rho/\rho_c$, and $\tau=T_c/T$; $\delta$ is a reduced density, and $\tau$ is a reversely reduced temperature; and $\rho$ is a density under reservoir conditions of a stratum, and T is a temperature under the reservoir conditions of the stratum;

Step 5: using the following reference constants required by the formula (1):

$T_c$=647.096K;

$\rho_c$=322 kg m$^{-3}$;

$R$=0.46151805 kJkg$^{-1}$K$^{-1}$ \hfill (2)-(4)

where $T_c$ is a critical temperature, and $\rho_c$ is a critical density; a value of a specific gas constant R is derived from a molar gas constant $R_m$ and a value of a molar mass M;

Step 6: obtaining an equation of the ideal gas part $\varphi^\circ$ of dimensionless Helmholtz free energy from a specific isobaric heat capacity equation $c_p^o$ in an ideal gas state:

$$\phi^\circ = \ln\delta + n_1^\circ + n_2^\circ \tau + n_3^\circ \ln\tau + \sum_{i=4}^{8} n_i^\circ \ln\left[1 - e^{-\gamma_i^\circ \tau}\right] \quad (5)$$

where a $c_p^o$ value is fitted through a nonlinear least square method to determine coefficients $b_0$ and $b_i$ and an index $\beta_i$; let $n_3^\circ = b_0 - 1$, where i takes an integer from 1 to 5, $$n_{i+3}^\circ = b_i \text{ and } \gamma_{i+3}^\circ = \beta_i/T_c, \quad (10)$$

to simplify the formula; and $n_i^\circ$ is a simplified coefficient, $\gamma_i^\circ$ is a simplified index, and the formula (5) can be obtained;

Step 7: representing a general form of the residual part $\varphi^r$ of dimensionless Helmholtz free energy as follows:

$$\phi^r = \sum_{i=1}^{7} n_i \delta^{d_i} \tau^{t_i} + \sum_{i=8}^{51} n_i \delta^{d_i} \tau^{t_i} e^{-\delta^{c_i}} + \sum_{i=52}^{54} n_i \delta^{d_i} \tau^{t_i} e^{-\alpha_i(\delta-\epsilon_i)^2 - \beta_i(\tau-\gamma_i)^2} + \sum_{i=55}^{56} n_i \Delta^{b_i} \delta \psi \quad (6)$$

where $d_i$, $t_i$, $\alpha_i$, $\beta_i$, $\gamma_i$ and $\epsilon_i$ belong to parameters of 45 Gaussian bell-shaped terms; $\psi$ is a special heat function, $\Delta$ is an arbitrary difference function, $b_i$ is an introduced intrinsic parameter, namely a parameter of a nonanalytic term, and $c_i$ is determined through indexes of Gaussian bell-shaped terms, and belongs to the parameters of 45 Gaussian bell-shaped terms;

Step 8: calculating values of functions $\Delta$, $\theta$, and $\psi$ of related nonanalytic terms:

$$\Delta = \theta^2 + B_i[(\delta-1)^2]^{a_i}$$

$$\theta = (1-\tau) + A_i[(\delta-1)^2]^{1/(2\beta_i)}$$

$$\psi = e^{-C_i(\delta-1)^2 - D_i(\tau-1)^2} \quad (7)\text{-}(9)$$

where $A_i$, $B_i$, $C_i$, $D_i$, $a_i$, and $\beta_i$ are introduced "intrinsic" parameters, i.e. parameters of nonanalytic terms, which are included in nonlinear fitting of the whole equation, and $\theta$ is an adjustable parameter function;

Step 9: calculating an enthalpy value according to the following formula:

$$h = u + pv \quad (10)$$

$$\frac{h(\delta, \tau)}{RT} = 1 + \tau(\phi_\tau^\circ + \phi_\tau^r) + \delta\phi_\delta^r \quad (11)$$

$$\phi_\tau^\circ = \left[\frac{\partial\phi^\circ}{\partial\tau}\right]_\delta, \phi_\tau^r = \left[\frac{\partial\phi^r}{\partial\tau}\right]_\delta, \text{ and } \phi_\delta^r = \left[\frac{\partial\phi^r}{\partial\delta}\right]_\tau \quad (12)$$

where h is the enthalpy value, u is system inner energy, p is an external pressure, v is a system volume, $\phi_\tau^\circ$ is a first derivative of $\phi^\circ$ with respect to $\tau$, $\phi_\tau^r$ is a first derivative of $\phi^r$ with respect to $\tau$, and $\phi_\delta^r$ is a first derivative of $\phi^r$ with respect to $\delta$;

Step 10: assuming ³He/enthalpy ratios of mantle and crust thermal endmembers to be $0.5\times10^{-12}$ cm³ STp/J and $1\times10^{-15}$ cm³ STp/J respectively, and estimating heat contributions of the mantle and the crust to the basin geothermal system according to a heat balance equation;

$$(^3\text{He/enthalpy})_{calculated} = X_M(^3\text{He/enthalpy})_{mantle} + (1 - X_M)(^3\text{He/enthalpy})_{crust} \quad (13)$$

where $X_M$ is a mantle heat fraction in the sample, (³He/enthalpy)$_{calculated}$ is a ³He/enthalpy ratio calculated according to the formula (1), and (³He/enthalpy)$_{mantle}$ and (³He/enthalpy)$_{crust}$ respectively represent ³He/enthalpy ratios of mantle and crust thermal endmembers;

Step 11: determining a calculated mantle heat fraction as the relative heat contribution of the mantle to the basin geothermal system, the remaining contribution to the basin geothermal system coming from the crust, a sum of contribution proportions of the two sources being 100%, the calculated mantle heat fraction indicating the contribution proportion of the mantle, and the remaining proportion indicating the contribution proportion of the crust; and Step 12: providing a reliable resource exploitation and reducing exploration risks based on results of the evaluation method for relative contributions of heat sources based on helium.

An oil and gas bearing basin has two major heat sources, namely the mantle source and the crust source. Analysis of relative contributions of heat sources of helium can help analyzing studies on the thermal driving mechanism of helium in the presence of deep thermal fluid activities, facilitating search for helium enrichment regions.

A computer readable storage medium storing a program is provided. The program, when executed by a processor, implements steps in the evaluation method for relative contributions of heat sources based on helium in the present disclosure.

An oilfield detection device includes a temperature monitoring system, a pressure monitoring system, a helium isotope analysis system, and a heat flow evaluation system. The temperature monitoring system uses a distributed temperature sensing (DTS) system, which achieves subsurface or surface continuous temperature monitoring according to a Raman scattering principle of optical fibers, can detect a temperature from −65° C. to 300° C., and is suitable for a high temperature environment; the pressure monitoring system uses a fiber Bragg grating pressure sensor, which has a maximum working temperature of 300° C., can detect a pressure up to 82 MPa, and is suitable for a subsurface high pressure environment; the helium isotope analysis system collects and analyzes the content of helium isotopes, and determines relative contributions of a mantle source and a crust source through isotope ratios; and the heat flow evaluation system obtains a final contribution of helium as a heat source according to real-time temperature and pressure parameters acquired by temperature and pressure sensors and helium isotope analysis results, and by using the evaluation method for relative contributions of heat sources based on helium in a computer software system, and feeds the contribution back to a control interface to complete evaluation of heat flow contribution, so as to indicate a degree of influence of deep thermal fluid in a drilling area.

The device can help explaining the following issues: 1, by comparing development conditions of fractures, diapirs and other structures in a study region with distribution of a contribution of deep thermal fluid, if a superimposed area exists, that a structure is communicated with the deep is indicated; 2, when analyzing a basin heat flow context and a thermal history, that the deep thermal fluid has contribution to basin heat flow is demonstrated; and 3, meanwhile, in oil and gas accumulation or burial history analysis, adjustment can be made when a low temperature gradient of a basic parameter is input.

The present disclosure has the following beneficial effects:

The present disclosure estimates relative heat contributions of the mantle and the crust to the basin geothermal system by combining $^3$He/enthalpy ratios calculated according to the formula (1) and the heat balance equation. Compared with existing evaluation and analysis method for determining crust and mantle sources of natural gas and their proportions according to helium isotope $^3$He/$^4$He distribution and the R/Ra value, the present disclosure is more accurate and further improves an evaluation method for relative contributions of heat sources of helium in the context of deep thermal fluid activities.

The detection device of the present disclosure is suitable for deep geothermal resource exploration, thermal fluid activity monitoring in an early stage of oil and gas field development, and geological science research. By precisely evaluating the relative contributions of the mantle source and the crust source, combined with temperature and pressure data, the present disclosure provides a scientific basis for resource exploitation and reduces exploration risks. This design combines geochemical analysis, geophysical exploration, and temperature and pressure monitoring techniques, achieves automated data processing and analysis through an intelligent control system, and can effectively support the research and application of deep thermal fluid activities.

DETAILED DESCRIPTION OF THE EMBODIMENTS

The present disclosure will be further explained with reference to the embodiments and the accompanying drawings, but not limited to this.

Embodiment 1

An evaluation method for relative contributions of mantle and crust heat sources in the context of deep thermal fluid activities includes the following steps:
Step 1: a geological survey is performed to confirm the presence of deep channel communication generated in a study region in the context of major faulting and the presence of development and evolution of mud diapirs and upward migration of thermal fluid;

Step 2: a sample is collected from a reservoir of a typical well in the study region, and is separated and purified;
Step 3: the sample is tested and analyzed to obtain the content of $CO_2$, $^3$He, and $^4$He;
Step 4: $^3$He/enthalpy ratios of samples in different depths are calculated according to a formula (1) and $CO_2$ and $^3$He concentration obtained through testing, where the formula (1) is expressed in a dimensionless form, i.e. $\varphi=f/(RT)$, which is divided into two parts, namely an ideal gas part $\varphi^\circ$ and a residual part $\varphi^\tau$, so $\varphi$:

$$\frac{f(\rho, T)}{RT} = \phi(\delta, \tau) = \phi^\circ(\delta, \tau) + \phi^r(\delta, \tau) \tag{1}$$

where $\delta=\rho/\rho_c$, and $\tau=T_c/T$; $\delta$ is a reduced density, and $\tau$ is a reversely reduced temperature; and $\rho$ is a density under reservoir conditions of a stratum, and T is a temperature under the reservoir conditions of the stratum;

Step 5: reference constants required by the formula (1) are used as follows:

$T_c$=647.096K;

$\rho_c$=322 kg m$^{-3}$;

$R$=0.46151805 kJkg$^{-1}$K$^{-1}$ \hfill (2)-(4)

where $T_c$ is a critical temperature, and $\rho_c$ is a critical density; and a value of a specific gas constant R is derived from a molar gas constant $R_m$ and a value of a molar mass M;

Step 6: an equation of the ideal gas part q° of dimensionless Helmholtz free energy is obtained from a specific isobaric heat capacity equation $c_p^o$ in an ideal gas state:

$$\phi^\circ = \ln\delta + n_1^\circ + n_2^\circ\tau + n_3^\circ\ln\tau + \sum_{i=4}^{8} n_i^\circ\ln\left[1 - e^{-\gamma_i^\circ\tau}\right] \tag{5}$$

where a $c_p^o$ value is fitted through a nonlinear least square method to determine coefficients $b_0$ and $b_i$ and an index $\beta_i$; let $n_3^\circ = b_0 - 1,$ where i is an integer from 1 to 5, $n_{i+3}^\circ = b_i,$ and $\gamma_{i+3}^\circ = \beta_i/T_c$ to simplify the formula; and $n_i^o$ is a simplified coefficient, $\gamma_i^o$ is a simplified index, and the formula (5) can be obtained;

Step 7: a general form of the residual part $\varphi^r$ of dimensionless Helmholtz free energy is represented as follows:

$$\phi^r = \sum_{i=1}^{7} n_i \delta^{d_i} \tau^{t_i} + \sum_{i=8}^{51} n_i \delta^{d_i} \tau^{t_i} e^{-\delta^{c_i}} + \sum_{i=52}^{54} n_i \delta^{d_i} \tau^{t_i} e^{-\alpha_i(\delta-\epsilon_i)^2 - \beta_i(\tau-\gamma_i)^2} + \sum_{i=55}^{56} n_i \Delta^{b_i} \delta \psi \quad (6)$$

where $d_i$, $t_i$, $\alpha_i$, $\beta_i$, $\gamma_i$ and Et belong to parameters of 45 Gaussian bell-shaped terms; $\psi$ is a special heat function, $\Delta$ is an arbitrary difference function, $b_i$ is an introduced intrinsic parameter, namely a parameter of a nonanalytic term, and $c_i$ is determined through indexes of Gaussian bell-shaped terms, and belongs to the parameters of 45 Gaussian bell-shaped terms;

Step 8: values of functions $\Delta$, $\theta$, and $\psi$ of related nonanalytic terms are calculated:

$$\Delta = \theta^2 + B_i[(\delta-1)^2]^{a_i}$$

$$\theta = (1-\tau) + A_i[(\delta-1)^2]^{1/(2\beta_i)}$$

$$\psi = e^{-C_i(\delta-1)^2 - D_i(\tau-1)^2} \quad (7)-(9)$$

where $A_i$, $B_i$, $C_i$, $D_i$, $a_i$, and $\beta_i$ are introduced "intrinsic" parameters, i.e. parameters of nonanalytic terms, which are included in nonlinear fitting of the whole equation, and $\theta$ is an adjustable parameter function;

Step 9: an enthalpy value is calculated according to the following formula:

$$h = u + pv \quad (10)$$

$$\frac{h(\delta, \tau)}{RT} = 1 + \tau(\phi_\tau^o + \phi_\tau^r) + \delta\phi_\delta^r \quad (11)$$

$$\phi_\tau^o = \left[\frac{\partial \phi^o}{\partial \tau}\right]_\delta, \phi_\tau^r = \left[\frac{\partial \phi^r}{\partial \tau}\right]_\delta, \text{ and } \phi_\delta^r = \left[\frac{\partial \phi^r}{\partial \delta}\right]_\tau \quad (12)$$

where h is the enthalpy value, u is system inner energy, p is an external pressure, v is a system volume, $\phi_\tau^o$ is a first derivative of $\phi^o$ with respect to $\tau$, $\phi_\tau^r$ is a first derivative of $\phi^r$ with respect to $\tau$, and $\phi_\delta^r$ is a first derivative of $\phi^r$ with respect to $\delta$;

Step 10: $^3$He/enthalpy ratios of mantle and crust thermal endmembers are assumed to be $0.5 \times 10^{-12}$ cm$^3$ STp/J and $1 \times 10^{-15}$ cm$^3$ STp/J respectively, and heat contributions of the mantle and the crust to a basin geothermal system is estimated according to a heat balance equation;

$$(^3\text{He/enthalpy})_{calculated} = X_M(^3\text{He/enthalpy})_{mantle} + (1 - X_M)(^3\text{He/enthalpy})_{crust} \quad (13)$$

where $X_M$ is a mantle heat fraction in the sample, ($^3$He/enthalpy)$_{calculated}$ is a $^3$He/enthalpy ratio calculated according to the formula (1), and ($^3$He/enthalpy)$_{mantle}$ and ($^3$He/enthalpy)$_{crust}$ respectively represent $^3$He/enthalpy ratios of mantle and crust thermal endmembers;

Step 11: a calculated mantle heat fraction is determined as the relative heat contribution of the mantle to the basin geothermal system, the remaining contribution to the basin geothermal system coming from the crust, a sum of contribution proportions of the two sources being 100%, the calculated mantle heat fraction indicating the contribution proportion of a mantle source, and the remaining proportion indicating the contribution proportion of a crust source; and Step 12: providing a reliable resource exploitation and reducing exploration risks based on results of the evaluation method for relative contributions of heat sources based on helium.

Embodiment 2

A computer readable storage medium storing a program is provided. The program, when executed by a processor, implements steps in the evaluation method for relative contributions of heat sources based on helium in embodiment 1.

Embodiment 3

An oilfield detection device includes a temperature monitoring system, a pressure monitoring system, a helium isotope analysis system, and a heat flow evaluation system. The temperature monitoring system uses a distributed temperature sensing (DTS) system, achieves subsurface or surface continuous temperature monitoring according to a Raman scattering principle of optical fibers, can detect a temperature from $-65°$ C. to $300°$ C., and is suitable for a high temperature environment. The pressure monitoring system uses a fiber Bragg grating pressure sensor, which has a maximum working temperature of $300°$ C., can detect a pressure up to 82 MPa, and is suitable for a subsurface high pressure environment. The helium isotope analysis system collects and analyzes the content of helium isotopes, and determines relative contributions of a mantle source and a crust source through an isotope ratio. The heat flow evaluation system obtains a final contribution of helium as a heat source according to real-time temperature and pressure parameters acquired by temperature and pressure sensors and helium isotope analysis results, and by using the evaluation method for relative contributions of heat sources based on helium in embodiment 1 in a computer software system, and feeds the contribution back to a control interface to complete evaluation of heat flow contribution, so as to indicate a degree of influence of deep thermal fluid in a drilling area.

The device can help explaining the following issues: 1, by comparing development conditions of fractures, diapirs and other structures in a study region with distribution of a contribution of deep thermal fluid, if a superimposed area exists, that a structure is communicated with the deep is indicated; 2, when analyzing a basin heat flow context and a thermal history, that the deep thermal fluid has contribution to basin heat flow is demonstrated; and 3, meanwhile, in oil and gas accumulation or burial history analysis, adjustment can be made when a low temperature gradient of a basic parameter is input.

A procedure of using the device:
1. Data collection and analysis: the helium isotope analysis system collects subsurface or surface helium samples through a dedicated sampling device. The system automatically analyzes the content of $^3$He and $^4$He isotopes in the helium samples and calculates a ratio of both isotopes. The temperature monitoring system monitors subsurface or surface temperature changes in real time through a distributed fiber sensor. The pressure monitoring system monitors subsurface pressure in real time through a fiber Bragg grating sensor. The heat flow evaluation system automatically calculates a heat flow contribution value, and analyzes the magnitude of contribution of deep thermal fluid.
2. Data transmission and storage: all collected data are transmitted to the heat flow evaluation system through a wireless or wired communication module, and are stored in a memory.
3. Data processing and analysis: a processor in the heat flow evaluation system runs a program, and calculates relative contributions of the mantle source and the crust source according to a helium isotope ratio and temperature and pressure data.
4. Result feedback and application: the heat flow evaluation system feeds a final helium heat source contribution result back to a user interface or a remote monitoring center. A user adjusts an exploration strategy or optimizes a drilling path according to an evaluation result. For example, if a contribution of mantle heat flow is found to be significant, it may indicate that a high temperature geothermal resource or an oil and gas reservoir exists in the deep, and targeted exploration work may be further carried out.
5. Follow-up operation: the heat flow evaluation system, according to a user command, combines the evaluation result and a geographic information system (GIS) to generate a heat source contribution distribution diagram. The distribution diagram may be used for guiding oil and gas field development plans, optimizing well location layouts, and improving resource development efficiency.

Other important components:

A data transmission module: configured to support 4G/5G wireless network or wired communication, and ensure real-time data transmission.

A user interface: configured to provide an intuitive operation interface, and display real-time data, analysis results, and history curves.

A power supply system: powered by solar energy or batteries, and suitable for oil fields in remote regions.

An environment monitoring module: configured to monitor parameters such as temperature and humidity in device operating environment, and ensure normal operation of the device in harsh conditions.

EXPERIMENTAL EXAMPLE

According to the method and steps in embodiment 1, the typical well in a gas field A with deep thermal fluid influence and deep and major faulting development was selected for verification.

According to Step 1 to Step 3, a gas sample in the well was collected, and was tested to obtain the content of main components $CO_2$, $^3$He, and $^4$He.

According to the formula (1) in Step 4 to Step 9, a $^3$He/enthalpy ratio of each sample was calculated.

According to the heat balance equation in Step 10, the mantle heat fraction $X_M$ was calculated.

To further verify the feasibility of the present disclosure, a correlation between a terrestrial heat flow value and the mantle heat fraction was adopted for analysis from a side. A formula relating to the terrestrial heat flow value and a $^3$He/$^4$He value was used:

$$R_C/R_A \times 140 = e^{0.143q-5.3} \quad (14)$$

where, $R_C/R_A$ is an atmospherically corrected $^3$He/$^4$He value, and q is the terrestrial heat flow value, in mW/m$^2$.

Calculation results are shown as Table 1:

TABLE 1

Calculation results of relative contributions of the mantle and the crust in the gas field A to a geothermal system

| No. | $CO_2{}^a$ | $^3$He$^b$ | $^3$He$^c$ | Enthalpy$^d$ | $^3$nthEnthalpy$^e$ | $^3$nthEnthalpy$^f$ | $X_M{}^g$ | $q^h$ |
|---|---|---|---|---|---|---|---|---|
| 1 | 0.0035 | 6.21 | 13.92 | 766.81 | 0.018 | 488 | 3.44 | 71.92 |
| 2 | 0.4668 | 2.06 | 4.62 | 313.40 | 0.015 | 396 | 2.75 | 71.81 |
| 3 | 0.3188 | 0.89 | 1.99 | 313.40 | 0.006 | 171 | 1.08 | 71.65 |
| 4 | 0.2067 | 0.99 | 2.22 | 334.38 | 0.007 | 178 | 1.13 | 71.64 |
| 5 | 0.7981 | 0.42 | 0.93 | 238.00 | 0.004 | 105 | 0.58 | 71.62 |

In the table, column a is $CO_2$ concentration under reservoir conditions, in mol/kg. Column b is $^3$He concentration under the reservoir conditions, in $10^{-12}$ mol/kg. Column c is a molar volume at STP (1 atm, 0° C.) obtained by multiplying $^3$He concentration (mol/kg) with 22414 cm$^3$, in $10^{-8}$ cm$^3$ STP/kg. Column d is an enthalpy value calculated according to the formula (1), in kj/kg. Column e is a ratio of $^3$He concentration in the molar volume to the enthalpy value, in $10^{-12}$ cm$^3$ STP/J. Column f is a ratio of $^3$He concentration converted to molar atomic number to the enthalpy value, in atoms $^3$He mW$^{-1}$s$^{-1}$. Column g is the mantle heat fraction, in %. Column h is the terrestrial heat flow value, in mW/m$^2$.

Figure 1:
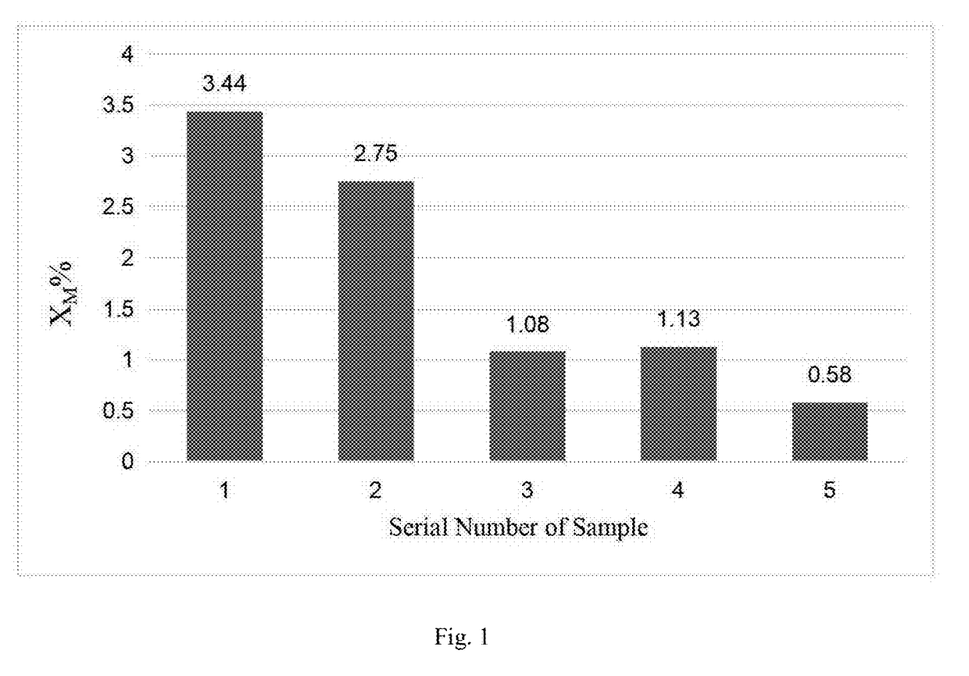
FIG. 1 is a histogram of mantle heat fractions of samples.

As shown in FIG. 1, according to the geological survey, samples 1 and 2 are located in the center of the gas field A, and areas corresponding to the samples 1 and 2 are influenced by a deep heat source; and samples 3 to 5 are located far from the center of the gas field, and are slightly influenced by the deep heat source. As shown in FIG. 1, the mantle heat fraction corresponding to the sample 1 is the highest, followed by the sample 2, and mantle heat fractions corresponding to samples 3 to 5 are lower. This indicates when a location is closer to the center and influenced by the deep heat source, the relative heat contribution of the mantle is higher.

Figure 2:
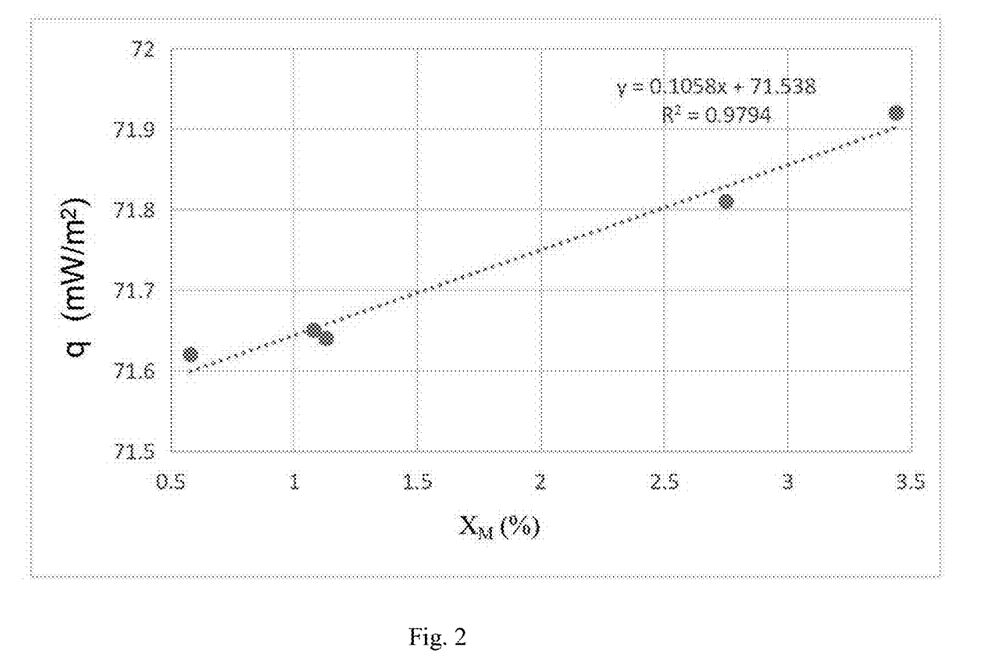
FIG. 2 is a diagram of a correlation between a mantle heat fraction and a terrestrial heat flow value.
Figure 3:
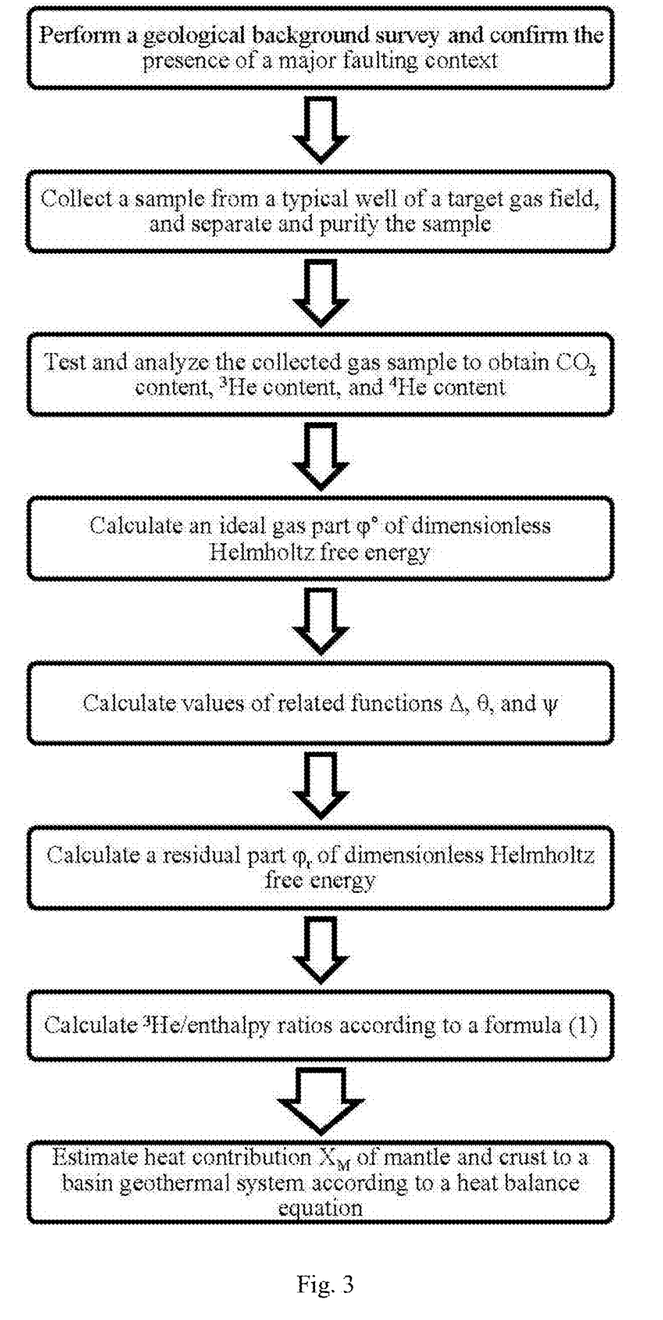
FIG. 3 is a flowchart diagram of the present disclosure.
Figure 4:
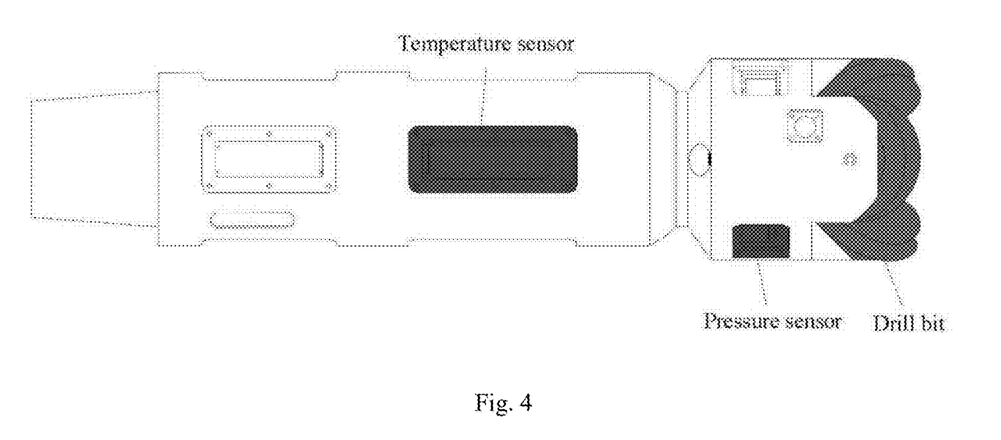
FIG. 4 is a schematic structural diagram of a device of the present disclosure.

As shown in FIG. 2, mantle heat fractions of samples 1 to 5 are positively correlated to the terrestrial heat flow value, which is consistent with the thermal driving effect of deep thermal fluid on mantle source $^3$He, further verifying the feasibility of the present disclosure.

What is claimed is:

1. An evaluation method for relative contributions of heat sources based on helium, comprising a non-transitory computer readable medium operable on a computer with memory for the evaluation method for relative contributions of heat sources based on helium, and comprising program instructions for executing the following steps of:

Step 1: performing a geological survey to confirm the presence of deep channel communication generated in a study region in the context of major faulting and the presence of development and evolution of mud diapirs and upward migration of thermal fluid;

Step 2: collecting a sample from a reservoir of a typical well in the study region separating and purifying the sample;

Step 3: testing and analyzing the sample to obtain the content of $CO_2$, $^3$He, and $^4$He;

Step 4: calculating $^3$He/enthalpy ratios of samples in different depths by a formula (1) and concentrations of $CO_2$ and $^3$He of the samples, wherein the formula (1) is expressed in a dimensionless form, $\varphi=f/(RT)$, which is divided into two parts, namely an ideal gas part $\varphi^\circ$ and a residual part $\varphi^r$, so $\varphi$:

$$\frac{f(\rho, T)}{RT} = \phi(\delta, \tau) = \phi^\circ(\delta, \tau) + \phi^r(\delta, \tau) \quad (1)$$

wherein $\delta=\rho/\rho_c$, and $\tau=T_c/T$; $\delta$ is a reduced density, and $\tau$ is a reversely reduced temperature; and $\rho$ is a density under reservoir conditions of a stratum, and T is a temperature under the reservoir conditions of the stratum; and r is a residual value;

Step 5: using the following reference constants required by the formula (1):

$T_c$=647.096K;

$\rho_c$=322 kg m$^{-3}$;

$R$=0.46151805 kJkg$^{-1}$K$^{-1}$ \quad (2)-(4)

wherein $T_c$ is a critical temperature, and $\rho_c$ is a critical density;

Step 6: obtaining an equation of the ideal gas part $\varphi^\circ$ from a specific isobaric heat capacity equation $c_p^o$ in an ideal gas state:

$$\phi^\circ = \ln\delta + n_1^\circ + n_2^\circ\tau + n_3^\circ\ln\tau + \sum_{i=4}^{8}n_i^\circ\ln[1 - e^{-\gamma_i^\circ\tau}] \quad (5)$$

wherein the $c_p^o$ is fitted through a nonlinear least square method to determine coefficients $b_0$ and $b_i$ and an index $\beta_i$; let $n_3^\circ = b_0 - 1,$ where i is an integer from 1 to 8, $n_{i+3}^\circ = b_i,$ and $\gamma_{i+3}^\circ = \beta_i/T_c,$ to simplify the formula; and $n_i^\circ$ is a simplified coefficient, $\gamma_i^\circ$ is a simplified index, and the formula (5) is obtained;

Step 7: representing a form of the residual part $\varphi^r$ as follows:

$$\phi^r = \sum_{i=1}^{7}n_i\delta^{d_i}\tau^{t_i} + \sum_{i=8}^{51}n_i\delta^{d_i}\tau^{t_i}e^{-\delta^{c_i}} + \sum_{i=52}^{54}n_i\delta^{d_i}\tau^{t_i}e^{-\alpha_i(\delta-\epsilon_i)^2-\beta_i(\tau-\gamma_i)^2} + \sum_{i=55}^{56}n_i\Delta^{b_i}\delta\psi \quad (6)$$

wherein $d_i$, $t_i$, $\alpha_i$, $\gamma_i$ and $\epsilon_i$ are parameters; $\psi$ is a special heat function, $\Delta$ is an arbitrary difference function, and $c_i$ is an index, and;

Step 8: calculating values of functions $\Delta$, $\theta$, and $\psi$ of related nonanalytic terms:

$\Delta=\theta^2+B_i[(\delta-1)^2]^{a_i}$ $\theta=(1-\tau)+A_i[(\delta-1)^2]^{1/(2\beta_i)}$ $\psi=e^{-C_i(\delta-1)^2-D_i(\tau-1)^2}$ \quad (7)-(9)

wherein $A_i$, $B_i$, $C_i$, $D_i$, and $a_i$ are introduced intrinsic parameters that are parameters of nonanalytic terms, which are included in nonlinear fitting of the whole equation, and $\theta$ is an adjustable parameter function;

Step 9: calculating an enthalpy value according to the following formula:

$$h = u + pv \quad (10)$$

$$\frac{h(\delta, \tau)}{RT} = 1 + \tau(\phi_\tau^\circ + \phi_\tau^r) + \delta\phi_\delta^r \quad (11)$$

$$\phi_\tau^\circ = \left[\frac{\partial\phi^\circ}{\partial\tau}\right]_\delta, \phi_\tau^r = \left[\frac{\partial\phi^r}{\partial\tau}\right]_\delta, \text{and } \phi_\delta^r = \left[\frac{\partial\phi^r}{\partial\delta}\right]_\tau \quad (12)$$

wherein h is the enthalpy value, u is system inner energy, p is an external pressure, v is a system volume, $\phi_\tau^\circ$ is a first derivative of $\phi^\circ$ with respect to $\tau$, $\phi_\tau^r$ is a first derivative of $\phi^r$ with respect to $\tau$, and $\phi_\delta^r$ is a first derivative of $\phi^r$ with respect to $\delta$;

Step 10: assuming $^3$He/enthalpy ratios of mantle and crust thermal endmembers and estimating heat contributions of the mantle and the crust to a basin geothermal system according to a heat balance equation;

$$(^3\text{He/enthalpy})_{calculated} = X_M(^3\text{He/enthalpy})_{mantle} + (1 - X_M)(^3\text{He/enthalpy})_{crust} \qquad (13)$$

wherein $X_M$ is a mantle heat fraction in the sample, $(^3\text{He/enthalpy})_{calculated}$ is a $^3$He/enthalpy ratio calculated according to the formula (1), and $(^3\text{He/enthalpy})_{mantle}$ and $(^3\text{He/enthalpy})_{crust}$ respectively represent $^3$He/enthalpy ratios of mantle and crust thermal endmembers;

Step 11: determining a calculated mantle heat fraction as the relative heat contribution of the mantle to the basin geothermal system, the remaining contribution to the basin geothermal system coming from crust, a sum of contribution proportions of the two sources being 100%, the calculated mantle heat fraction indicating the contribution proportion of the mantle, and the remaining proportion indicating the contribution proportion of the crust; and Step 12: optimizing a drilling path based on results of the evaluation method for relative contributions of heat sources based on helium which provides a reliable resource exploitation and reduces exploration risks.

2. The evaluation method for relative contributions of heat sources based on helium according to claim 1, wherein the $^3$He/enthalpy ratios of mantle and crust thermal endmembers are assumed to be $0.5 \times 10^{-12}$ cm$^3$ STp/J and $1 \times 10^{-15}$ cm$^3$ STp/J respectively.

3. An oilfield detection device, comprising a temperature monitoring system, a pressure monitoring system, a helium isotopic measurement device, and a heat flow evaluation system, wherein the temperature monitoring system uses a distributed temperature sensing (DTS) system, which achieves subsurface or surface continuous temperature monitoring according to a Raman scattering principle of optical fibers and can detect a temperature from −65° C. to 300° C.; the pressure monitoring system uses a fiber Bragg grating pressure sensor, which has a maximum working temperature of 300° C. and can detect a pressure up to 82 MPa; the helium isotope analysis system is configured to collect and analyze the content of helium isotopes and determine relative contributions of a mantle source and a crust source through an isotope ratio; and the heat flow evaluation system obtains a final contribution of helium as a heat source according to real-time temperature and pressure parameters acquired by temperature and pressure sensors and helium isotope analysis results, and by using the evaluation method for relative contributions of heat sources based on helium as claim 1 in a computer software system, and to feed the contribution back to a control interface to complete evaluation of heat flow contribution, so as to indicate a degree of influence of deep thermal fluid in a drilling area.

\* \* \* \* \*